United States Patent
Fujita et al.

(12)

(10) Patent No.: US 6,281,506 B1
(45) Date of Patent: Aug. 28, 2001

(54) X-RAY IMAGING APPARATUS

(75) Inventors: Terutoshi Fujita, Nishinasuno-machi; Katsutoshi Itoh, Nishinasunomachi, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/051,193
(22) PCT Filed: Oct. 4, 1996
(86) PCT No.: PCT/JP96/02896
  § 371 Date: Jul. 20, 1998
  § 102(e) Date: Jul. 20, 1998
(87) PCT Pub. No.: WO97/12549
  PCT Pub. Date: Oct. 4, 1997

(30) Foreign Application Priority Data

| Oct. 5, 1995 | (JP) | 7-258404 |
| Oct. 5, 1995 | (JP) | 7-258405 |
| Jul. 30, 1996 | (JP) | 8-200325 |

(51) Int. Cl.$^7$ .................................................. A61B 6/00
(52) U.S. Cl. .................................. 250/370.09; 250/370.08
(58) Field of Search ........................ 250/370.09, 370.08, 250/483.1

(56) References Cited

U.S. PATENT DOCUMENTS

| 4,641,182 | * | 2/1987 | Gur | 358/41 |
| 4,857,724 | | 8/1989 | Snoeren. | |
| 5,408,521 | * | 4/1995 | Grady | 378/96 |

FOREIGN PATENT DOCUMENTS

| 0506177 | * | 9/1992 | (EP). |
| 63-299581 | | 12/1988 | (JP). |
| 2-298186 | | 12/1990 | (JP). |
| 4-7637 | | 2/1992 | (JP). |
| 5-219453 | | 8/1993 | (JP). |
| 6-114045 | | 4/1994 | (JP). |
| 7-203305 | | 8/1995 | (JP). |

* cited by examiner

Primary Examiner—Georgia Epps
Assistant Examiner—Richard Hanig
(74) Attorney, Agent, or Firm—Pillsbury Winthrop LLP

(57) ABSTRACT

An X-ray imaging apparatus 1 includes an imaging device 31. Imaging device 31 has a lens 33, an imaging device 37, a circuit for driving the imaging device, and a board 53, 57 having a circuit used for processing video signals that are produced from the imaging device. These structural elements of the imaging device 31 are integrally rotatable as one body. Even when an X-ray image intensifier and an X-ray generator are revolved around the object, an output image formed on the output surface can be displayed as an upright image, if required. In addition, only the structural component by which the lens and the board 53 are connected together requires a certain level of precision, so that the cost for preparing the structural components of the apparatus is low as a whole.

8 Claims, 9 Drawing Sheets

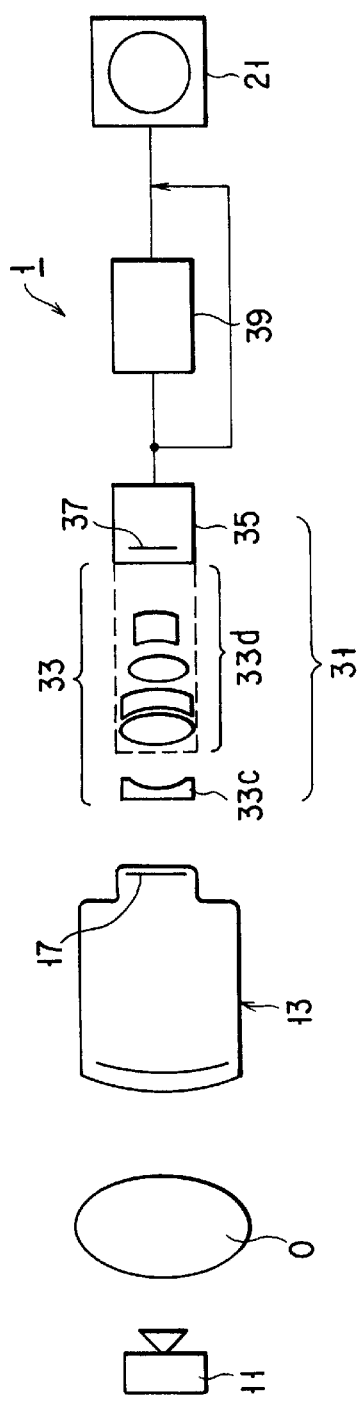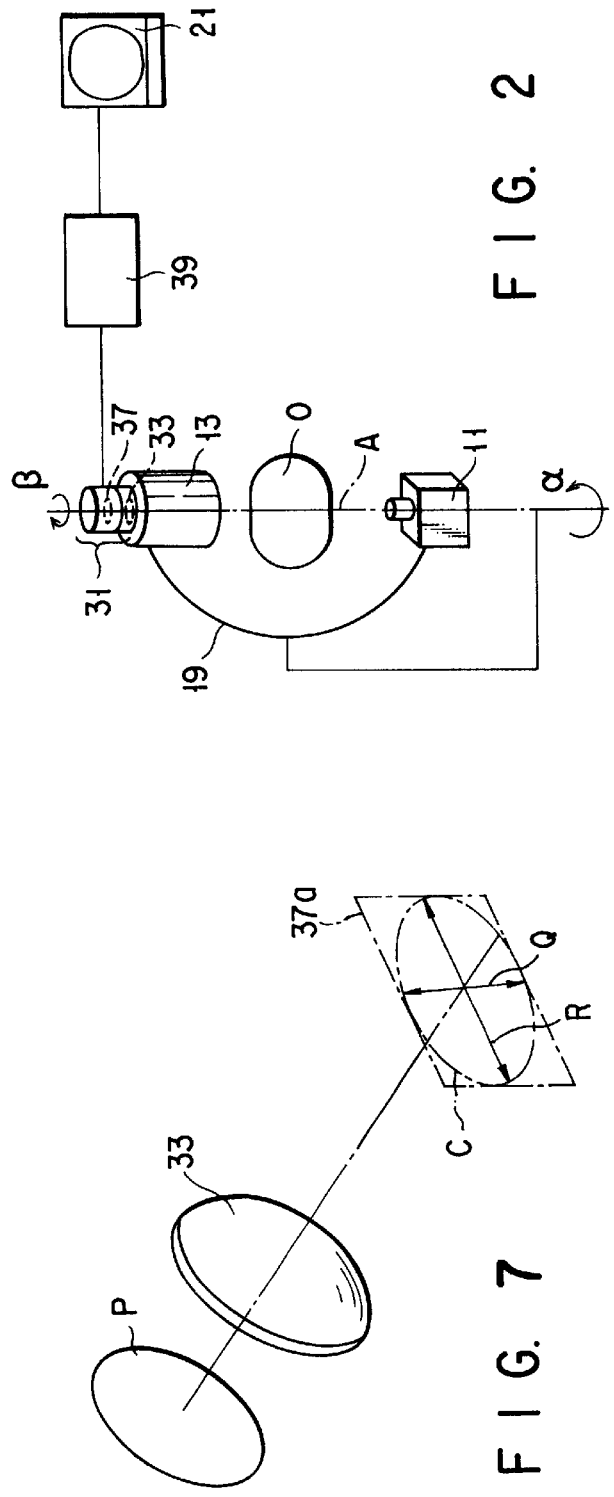

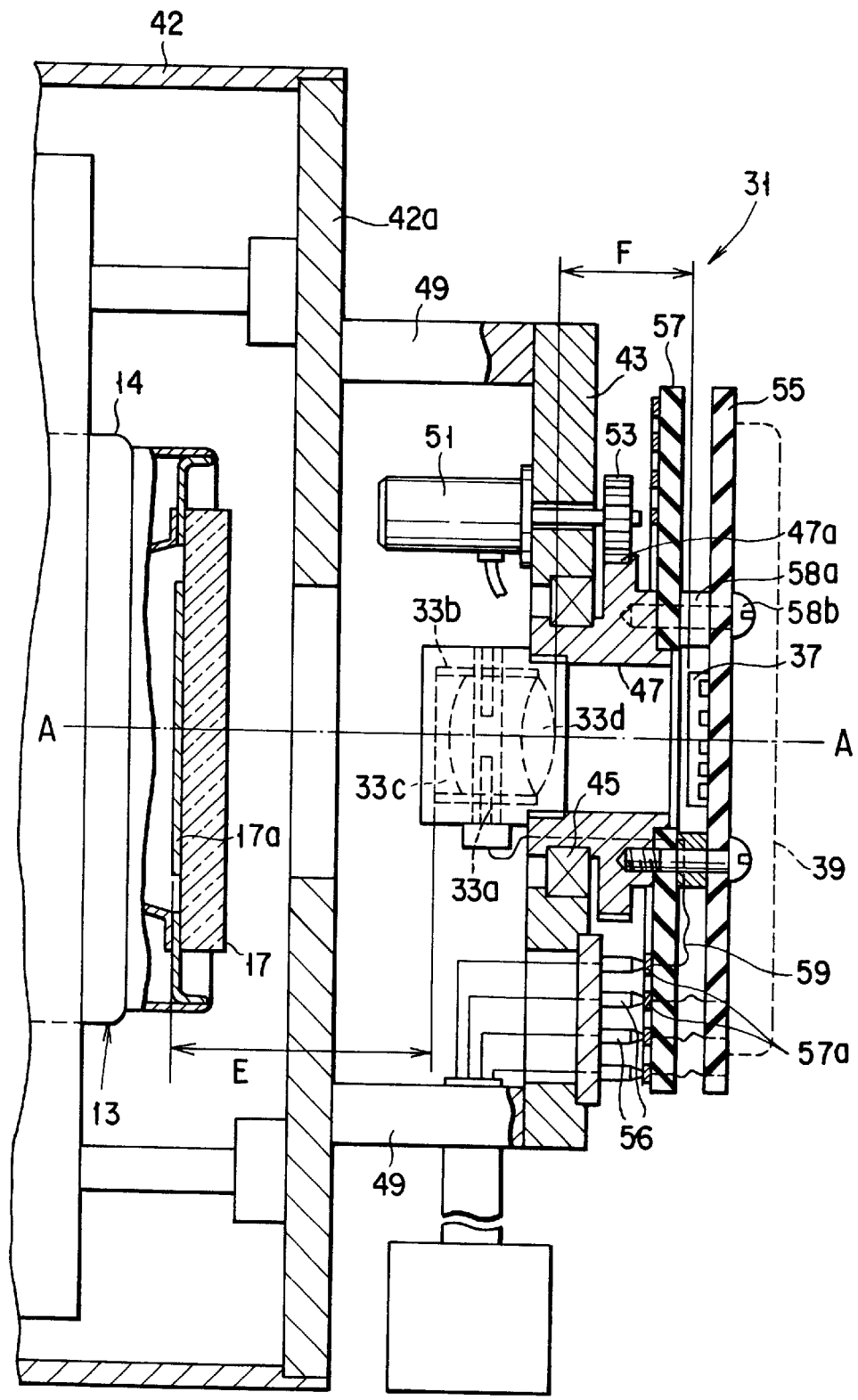
F I G. 4

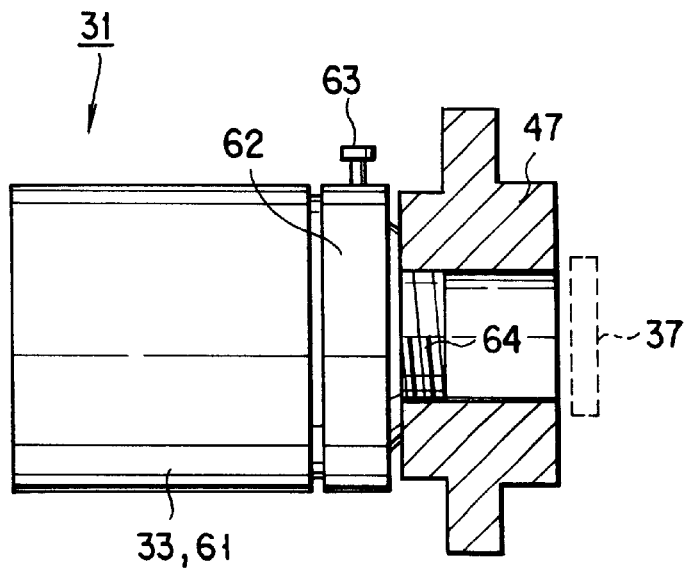
F I G. 9
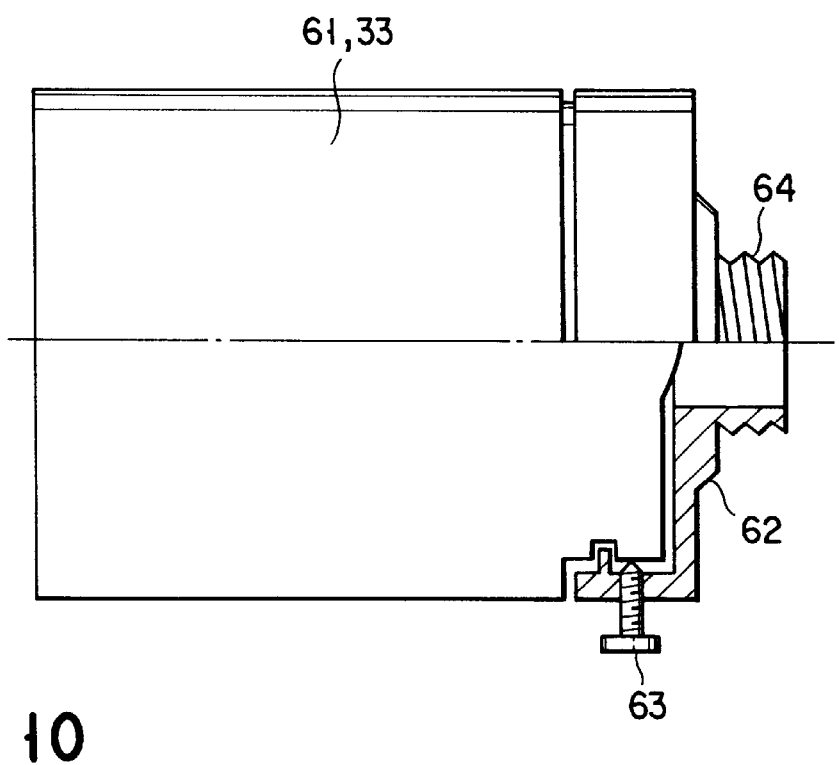
F I G. 10

X-RAY IMAGING APPARATUS

TECHNICAL FIELD

The present invention relates to an X-ray imaging apparatus incorporating a camera from which electric image signals are picked up, more specifically to an improvement of a camera section having a function of rotating an image.

BACKGROUND ART

An X-ray imaging apparatus is useful in examining VISCUS of a human body or the interior of an object. X-rays radiated to a human body or an object are detected as an X-ray transmission concentration distribution, i.e., an X-ray image, and this X-ray image is converted into a visible-light image. The visible-light image is further converted into electric image signals, and the X-ray transmission concentration distribution or the X-ray image is displayed on a monitor or the like in real time. Image information is stored in a storage of a computer or the like, for later use.

An X-ray imaging apparatus is provided with: an X-ray generator for generating X-rays; an X-ray image intensifier for intensifying and converting an X-ray image, i.e., the X-rays which are output from the X-ray generator and have passed through an object, into a visible-light image; and a monitor device for displaying an output image which is a visible image obtained by conversion by the X-ray image intensifier. The monitor device can display the output image in real time, since it uses a camera that images the output image of the X-ray image intensifier and outputs electric image signals.

X-rays radiated from the X-ray generator pass through an object and are incident on the X-ray image intensifier in the form of an X-ray image. This X-ray image is first intensified by the X-ray image intensifier and is then converted into a visible-light image. This visible-light image is displayed on the output surface of the X-ray image intensifier as an output image.

The output image on the output surface of the X-ray image intensifier is projected through a lens on the imaging surface of the imaging device of the camera. The image projected on the imaging surface of the imaging device is converted into electric image signals by the imaging device, and is displayed on the monitor device.

In the X-ray imaging apparatus, the imaging device, including the X-ray image intensifier and the camera which are arranged to oppose the X-ray generator, with the object located therebetween, is revolved around the object in an arbitrary direction and moved to an arbitrary position.

In this type of X-ray imaging apparatus, the camera has to be revolved around the object in the opposite direction so that the observer can rotate the image in an arbitrary direction, for the correction of the image direction.

In the above X-ray imaging apparatus, the camera can be revolved, for example, in the following method. A board, on which the camera is mounted along with a circuit for driving the camera and a signal circuit for processing video signals output from the camera, is fixed to a disk-shaped flange. Then, this flange is fixed to a lens support frame secured to the X-ray image intensifier by means of a bearing. In this manner, the camera is allowed to revolve relative to the X-ray image intensifier.

However, this method is disadvantageous in that the signal lines and power supply lines led from the board may be easily twisted when the camera incorporating the imaging device is revolved. In this case, the angle of revolution of the camera must be restricted so as to prevent the signal lines and power supply lines from being twisted. During the observation of the object, therefore, the camera may have to be revolved in the opposite direction so as to move the camera to the intended revolving position, which lengthens the time needed for observation.

FIG. 15 is a schematic illustration showing an example of a presently-available X-ray imaging apparatus capable of rotating an image.

As shown in FIG. 15, the X-ray imaging apparatus 101 comprises: an X-ray image intensifier 111 for intensifying and converting an X-ray image, i.e., X-rays output from the X-ray generator and passing through an object to be imaged, into a visible-light image; and a camera 121, i.e., an imaging device, for imaging the output image produced on the output surface and converting the output image into image signals, thereby enabling a video image to be displayed on a monitor device (not shown).

A support frame 123a is secured on the output side of a housing 115 in which the X-ray image intensifier 111 is arranged.

The camera 121 is made up of: a lens 123 supported by means of the support frame 123a and spaced from the output image 114 of the X-ray image intensifier 111 by a predetermined distance; a CCD imaging device 127 having a disk shape and positioned at the image focus position on a rotatable circuit board 125; a motor 129 for rotating the circuit board 125; and a signal transmission mechanism 131 for transmitting output signals of the imaging device 127, which are sent thereto from the circuit board 125, to an external circuit, and for applying driving power to the imaging device 127. By the circuit board 125, the imaging device 127 is allowed to revolve around the central axis A of a visible-light image transmitted through the lens 123. The circuit board 125 is rotatably held by support frame 125a fixed to the support frame 123a.

The signal transmission mechanism 131 includes: a gear 133 for revolving the imaging device 127 and circuit board 125 in such a manner that the center of the visible-light image output from the lens 123 coincides with the axis of revolution; an electrode drum 137 which is coaxial with the support frame 125a, is supported by a bearing 135 to be rotatable with reference to an auxiliary frame 125b inserted into the support frame 125a, and permits the output signal from the imaging device 127 to be led to an external circuit; and a plurality of brushes 139 which are fixed to the auxiliary frame 125b of the cylindrical support frame 125a and electrically connect ring electrodes 136 of the electrode drum 137 to the signal lines and power supply lines. The electrode drum 137 is coaxial with the center of rotation on which the circuit board 125 and gear 133 are rotated, i.e., with the central axis A of the visible-light image output from the lens 123.

In the X-ray imaging apparatus 101 shown in FIG. 15, the output signals of the imaging device 127, which are output by way of the circuit board 125, are sent to an external device (not shown) by means of the electrode drum 137 and brushes 139 of the signal transmission mechanism 131.

With this structure, the signal lines and power supply lines attached to the circuit board 125 do not impose any limit on the angle of revolution of the imaging device 127.

In the apparatus shown in FIG. 15, however, the electrode drum 137 is used. Due to the use of this drum, the camera 121 is inevitably long in the direction of the axis around which the camera 121 is revolved.

In addition, the image formed by the camera 121 must be displayed in the center of the display screen without reference to the position of revolution of the camera 121. Since the center of the image which the lens 123 forms based on the output image 114 of the X-ray image intensifier 111 must coincide with the center of the imaging surface of the imaging device 127, the axis of revolution defined by the revolution of the imaging device 127 and the center of the imaging surface of the imaging device 127 must coincide with each other. Further, in order to prevent the resolution from becoming low in the peripheral portions of the image, the plane in which the lens 123 forms an image by the output image 114 must be exactly the same as the imaging surface of the imaging device 127. It is therefore required that the central axis of the lens 123 and the axis defined by the revolution of the imaging device 127 coincide with each other. When the electrode drum 137 is coupled to the bearing 135 and when the bearing 135 is coupled to the auxiliary frame 125b of the support frame 125a, the tilt angle and the eccentricity of each structural member must be within an allowable range. This means that the electrode drum 137 and the support frames 125a and 123a must be fabricated and worked with high precision. This inevitably increases the cost required for manufacturing the structural members and the cost required for assembling them.

Accordingly, an object of the present invention is to provide an X-ray imaging apparatus which enables reduction in both the cost for manufacturing structural members and the cost for assembling them, and which includes a camera that is smaller in size and can be revolved without any restriction even when an object is rotated.

The present invention has been made after due consideration of the problems described above, and is intended to provided an X-ray imaging apparatus comprising: an X-ray image intensifier for converting an X-ray image into a completely-round output visible-light image; an optical lens assembly for focusing the output visible-light image on a predetermined position; a solid-state imaging device arranged at the position where the output visible-light image is focused by the optical lens assembly; a signal processing circuit board for driving the solid-state imaging device and processing output image signals produced therefrom; a support frame, mechanically fixed to the X-ray image intensifier, for mechanically supporting the optical lens assembly, solid-state imaging device and signal processing circuit board; and a revolving mechanism for revolving the solid-state imaging device relative to the X-ray image intensifier such that an optical center axis coincides with the center of revolution of the solid-state imaging device, the signal processing circuit board being arranged such that the optical center axis extends therethrough and the solid-state imaging device being fixed to the signal processing circuit board, the optical lens assembly being coupled to the signal processing circuit board directly or with another member interposed, such that the optical lens assembly and the signal processing circuit board constitute one mechanical body, a rotating motor being fixed to the support frame and rotating the solid-state imaging device, the signal processing circuit board and the optical lens assembly as one body with reference to the support frame, a plurality of slip rings being arranged in the neighborhood of the solid-state imaging device in a concentric manner and being rotatable together with the solid-state imaging device, and electric power and output image signals being supplied to the solid-state imaging device and the signal processing circuit board by way of the slip rings.

In the X-ray imaging apparatus of the present invention, the slip rings may be concentrically fixed to the signal processing circuit board or to a flat plate provided independently of the signal processing circuit board and arranged perpendicular to the optical center axis.

In the X-ray imaging apparatus of the present invention, the optical lens assembly may include an anamorphic lens system incorporating a cylindrical lens, and the solid-state imaging device may have a rectangular image-receiving surface. In this case, the anamorphic lens system forms an elliptical image by enlarging or reducing the output visible-light image of the X-ray image intensifier in one direction, and projects the elliptical image on the rectangular image-receiving surface of the solid-state imaging device such that the longer-axis direction of the elliptical image and that of the image-receiving surface coincide with each other.

In the X-ray imaging apparatus of the present invention, the optical lens assembly may be arranged in the space inside the support frame, and the motor may be arranged in the space surrounding the optical lens assembly.

In the X-ray imaging apparatus of the present invention, the optical lens assembly may include an electrically-driven diaphragm. A signal for driving this diaphragm is supplied by way of the slip rings.

In the X-ray imaging apparatus of the present invention, a cylindrical lens may be used to form an image whose size is reduced in the vertical direction of the solid-state imaging device.

BRIEF DESCRIPTION OF DRAWINGS

FIG. 1 is a schematic illustration of an X-ray imaging apparatus which is according to one embodiment of the present invention and which captures an output image formed on the output surface of the X-ray image intensifier.

FIG. 2 is a schematic illustration showing a direction in which the imaging unit and the X-ray image formation unit-holding device are revolved in the X-ray imaging apparatus depicted in FIG. 1.

FIG. 4 is a partially-enlarged view showing detailed structures of the imaging device, which are fixed to the X-ray image intensifier in the manner shown in FIG. 3.

FIG. 7 is a schematic illustration showing the relationships between the shape of the imaging surface of the imaging device of the imaging device and the power of the lens.

FIG. 9 is a schematic illustration showing how the camera and lens of the imaging device shown in FIG. 4 are fixed.

FIG. 10 is a partially-enlarged view showing in more detail the manner in which the camera and lens depicted in FIG. 9 are fixed.

BEST MODE OF CARRYING OUT THE INVENTION

Figure 3:
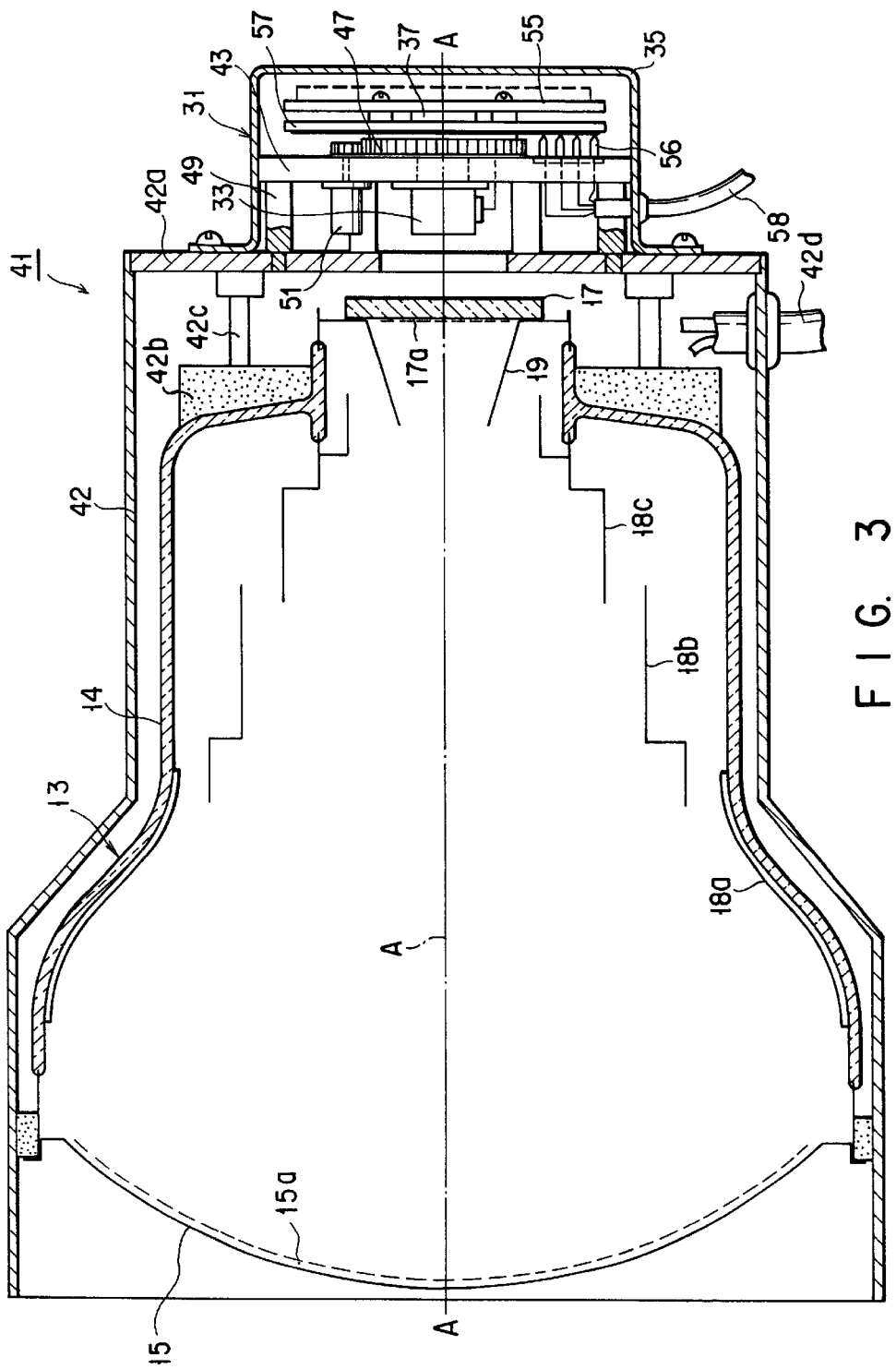
FIG. 3 is a sectional view showing detailed structures of the X-ray image intensifier and the imaging device employed in the X-ray imaging apparatus depicted in FIG. 1.

Embodiments of the present invention will now be described in detail with reference to the accompanying drawings.

FIG. 1 is a schematic illustration of an X-ray imaging apparatus according to one embodiment of the present invention.

As shown in FIG. 1, an X-ray imaging apparatus 1 comprises: an X-ray generator 11 for generating X-rays; an X-ray image intensifier 13 for intensifying and converting an X-ray image, i.e., X-rays generated by the X-ray generator 11 and transmitted through an object O, into a visible-light image; a monitor device 21 for enabling an output image of the X-ray image intensifier 13, i.e., the visible-light image which the X-ray image intensifier 13 outputs after conversion, to be displayed with no need to employ a recording medium, such as a film or a photograph; and a camera 31 for capturing the output image of the X-ray image intensifier 13 and outputting electric image signals so that the monitor device 21 can display the output image converted from the visible-light image of the X-ray image intensifier 13.

The output image formed on the output screen 17a of the X-ray image intensifier 13 is projected on the rectangular imaging surface of the CCD imaging device 37 of the camera 35 by the anamorphic lens system 33 of the camera 31. The visible-light image projected on the imaging surface of the imaging device 37 is converted into image signals by the imaging device 37. After being subjected to predetermined image processing by an image processing apparatus 39, the image signals are displayed on the monitor device 21.

As shown in FIG. 2, the X-ray generator 11, the X-ray image intensifier 13 and the camera 31 are revolved with the axis A of revolution as a center, in such a manner that the X-ray image intensifier 13 and the camera 31 are opposed to the X-ray generator 11, with the object O located between them. By this revolution, the X-ray imaging apparatus 1 can observe the object from various directions.

The X-ray generator 11 and the camera 31 are connected together by means of a C-arm 19 (an arm that is shaped like "C"). With the C-arm rotated, the X-ray generator 11 and the camera 31 image the object O from an arbitrary direction.

In the above X-ray image imaging apparatus wherein the X-ray image intensifier 11 can be revolved, the C-arm 19, by which the X-ray image intensifier 13 and the X-ray generator 11 are integrally held, is rotated in direction a so as to observe the object O from various directions. In order for the output image of the X-ray image intensifier 13 (which image is projected on an imaging device 37 by lens 33) to be output on the monitor device 21 with the image of the object O being displayed in the upright state, the imaging device 37 (i.e., the camera 31) is rotated in the reverse direction β by an angle corresponding to the angle for which the X-ray image intensifier 13 is rotated.

FIG. 3 is a sectional view showing how the X-ray image intensifier 13 and the camera 31, both employed in the X-ray imaging apparatus shown in FIGS. 1 and 2, are assembled together to constitute an X-ray imaging unit 41.

As shown in FIG. 3, the X-ray image intensifier 13 and the camera 31 of the X-ray imaging apparatus 1 shown in FIGS. 1 and 2 are assembled to be integral with the housing 42 of the X-ray image intensifier 13.

The X-ray image intensifier 13 is defined by a vacuum envelope 14. At one end of this envelope 14, the X-ray image intensifier 13 has an input screen 15a formed on the inner side of an input window, which is made of aluminum, for example. At the other end of the envelope 14, i.e., at the end opposing the input screen 15a, the X-ray image intensifier 13 has an output fluorescent screen 17a. This screen 17a is formed on the inner side of an output glass board 17 and outputs a visible-light image which can be captured by the camera 31.

First to third focusing electrodes 18a–18c and an anode 19 are arranged between the input screen 15a and the output screen 17a.

X-rays generated from the X-ray generator 11 are transmitted through the object O and are incident on the input screen 15a of the X-ray image intensifier 13, thus forming an X-ray image. By the input screen 15a, the X-ray image is converted into an electronic image. This electronic image is accelerated and focused by the thirst to third focusing electrodes 18a–18c and the anode 19, and is then converted into a visible-light image by the output screen 17a.

The X-ray image intensifier 13 is firmly fixed to the housing, for example at the outer periphery of the input window 15 and the outer periphery of the output glass 17, by use of insulating members 42b and support poles 42c.

At the output end of the housing 42, a bottom plate 42a is arranged. This bottom plate 42a is mechanically strong, and has an opening corresponding in position to the output glass 17 and having a predetermined diameter.

The camera 31 is attached to the rear side of the bottom plate 42a.

A camera flange 43, which is made of a mechanically strong metal disk, is fixed to the rear side of the bottom plate 42a by means of six support poles 49. A rotatable flange 47, the outer periphery of which is partly a gear 47a, is rotatably held by the central portion of the camera flange by means of a bearing 45. The anamorphic lens 33 is secured on the front side of the rotatable flange 47. A slip ring electrode board 57 and a circuit board 55 on which the CCD imaging device 37 is secured, are integrally fixed to the rear side of the rotatable flange 47. These structural components are rotatable endlessly by a motor 51 fixed to the camera flange 43.

Power and signals are supplied between the circuit board 55 and an external device, e.g., a monitor, connected to an external cable 58, through a plurality of slip rings provided on the slip ring electrode board 57 and a plurality of brushes 56 kept in contact with the slip rings. The camera 31 is housed in a shield case 35. A high-voltage power supply cable 42d extends through the housing 42 and is connected to the X-ray image intensifier.

As described above, the camera 31 includes the lens 33 and the imaging device 37 (which is located at the position where the output image passing through the lens 33 is focused), and a visible-light image output from the output fluorescent screen 17a is converted into electric signals.

A more detailed description will be given with reference to FIG. 4.

The lens 33 is held by the rotatable flange 47 in such a manner as to be rotatable around the central axis A passing through the output screen 17a of the X-ray image intensifier 13. The rotatable flange 47 is rotatably held at the substantial center of the camera flange 43 by means of the bearing 45, and the rotatable flange 47 is spaced from the output screen 17a of the X-ray image intensifier 13 by a predetermined distance by means of the bottom plate 42a.

The lens 33 is an electrically-driven zoom lens and includes: an electrically-driven diaphragm 33a whose aperture can be adjusted by an aperture stop motor (not shown) in response to an external control signal; a number of lenses for changing a magnifying power by changing the distance by an electrically-driven zoom mechanism 33b of a zoom motor for varying the magnifying power (not shown) in response to an external control signal.

A plurality of contact brushes 56 are provided for the camera flange 43. These brushes 56 are in contact with the slip rings, which will be detailed later with reference to FIG. 5. The brushes 56 maintain electric connection to the slip rings irrespective of the rotation of the rotatable flange 47, and do not impose any restrictions on the rotation of the rotatable flange 47. The brushes 56 are arranged on the respective concentric circles, which are defined with the axis A of rotation as a center.

The camera flange 43 is supported by the six support poles 49 such that the imaging device 37 fixed to the circuit board 55 is located in the center of the camera flange 43. The central axis of the imaging device 37 is made to coincide with the axis of the lens 33, i.e., the axis A of rotation.

A gear 53 is arranged radially inward of the circle that passes through the positions where the support poles 49 are provided. The gear 53 engages with the gear 47a of the rotatable flange 47 and serves to transmit the torque of the motor 51 to both the rotatable flange 47 and the lens 33 connected thereto.

The imaging device 37, a driving circuit (not shown) for driving the imaging device 37, and a circuit board 55 has a circuit section 39 including an image processing circuit for processing video signals produced by the photoelectric conversion by the imaging device 37, are fixed to the rotatable flange 47.

The board 57 having a number of slip rings 57a is located between the gear 47a and the circuit board 55 mounted with the cylindrical end portion of the rotatable flange 47. The circuit board 55 and the board 57 are firmly fixed to the rotatable flange 47 by means of four insulating spacers 58a and four screws 586. The spacers 58a are interposed between the board 57 and the circuit board 55, so that these boards are spaced from each other by a predetermined distance.

Figure 5:
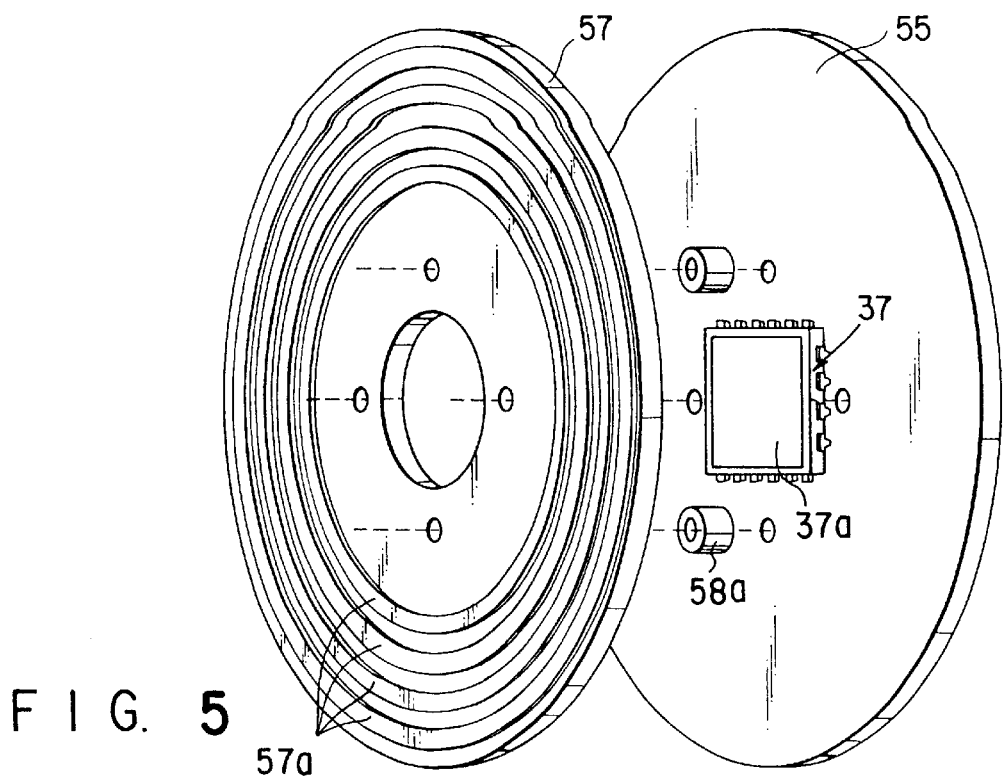
FIG. 5 is a schematic illustration showing the imaging device and slip rings of the imaging device depicted in FIG. 4.

As shown in FIG. 5, the board 57 has a number of concentric electrodes, i.e., slip rings 57a, which are formed with the axis A of rotation as a center. The signal lines and power supply lines led from the circuit board 55, and the drive signal lines led from the electrically-driven diaphragm 33a of the lens 33 and the electrically-driven zoom mechanism 33b are connected to the slip rings 57a.

The circuit board 55 holding the imaging device 37 in the center of it and the board 57 are integrally formed as one body, with the rotatable flange 47 being used as a support member.

With this structure, the torque of the motor 51 fixed to the camera flange 43 is transmitted to the gears 53 and 47a which are in engagement with each other, and the circuit board 55 and the board 57 are rotated by an arbitrary angle in an arbitrary direction in an endless manner. By means of the slip rings 57a of the board 57 and the brushes 56, power can be reliably supplied to the circuit board 55 and the lens 33, and the video signals output from the imaging device 37 can be reliably sent, without being restricted by the rotating angle of the rotatable flange 47.

The lens 33 and the imaging device 37 are integrally rotated by the cylindrical section of the rotatable flange 47, and a substantially circular output image output from the substantially circular output fluorescent screen 17a of the X-ray image intensifier 13 is incident on the imaging surface of the imaging device 37. In this case, the axis of the lens 33, i.e., the axis A of rotation, and the center point of the imaging surface of the imaging device 37 are not shifted from each other.

Figure 15:
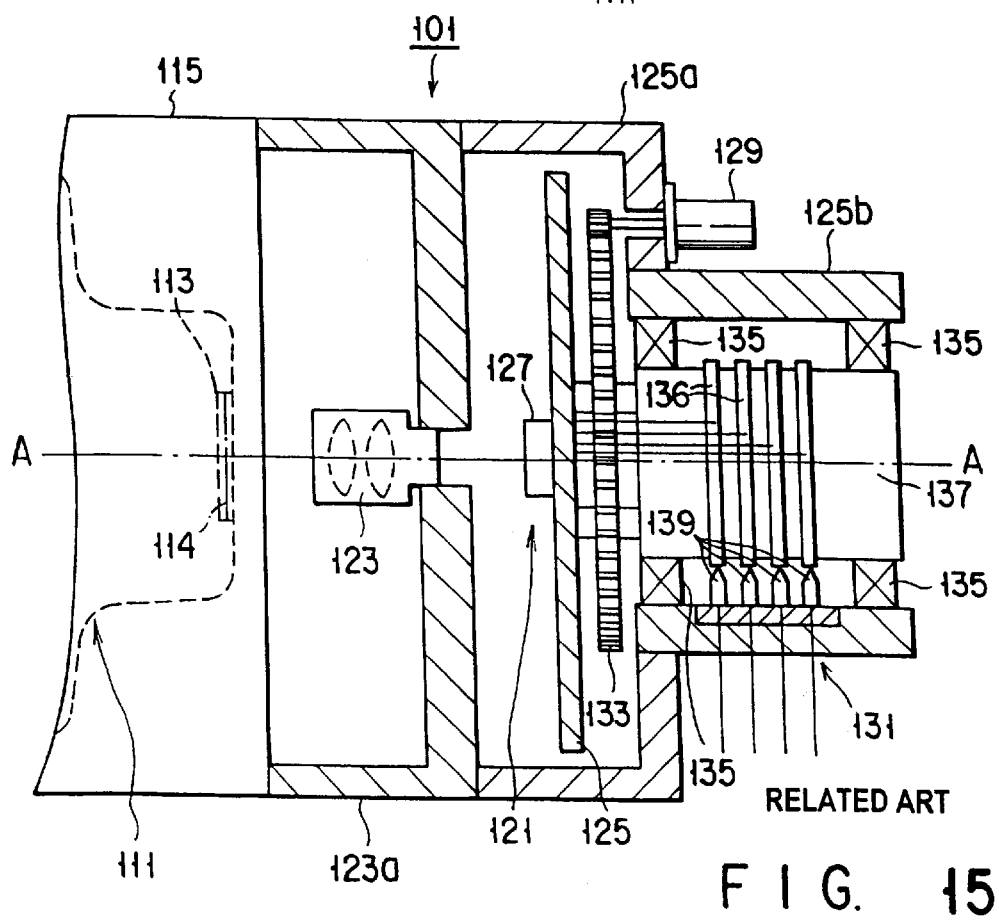
FIG. 15 is a schematic view showing an example of an imaging device, which is incorporated in a known X-ray imaging apparatus.

The circuit board 55 and the board 57 are made of comparatively thin disks arranged in planes perpendicular to the central axis A, and are located close to each other. In addition, the lens 33 is fixed to the front portion of the rotatable flange 47. Accordingly, the size of the X-ray imaging apparatus, i.e., the length measured in the axial direction, is less than the corresponding length of the conventional apparatus shown in FIG. 15.

Although the high working precision is required in order to permit the axis A of rotation to coincide with the central axis of the lens 33 during the rotation of the camera 31, the structural components requiring such high working precision are limited to the rotatable flange 47 in the case of the present invention. In other words, since only the rotatable flange 47 has to be worked with high precision, the manufacturing cost can be reduced, accordingly.

Let us assume that the output screen 17a of the X-ray imaging intensifier 13 has a diameter of 30 mm, and that the aspect ratio of the light-receiving surface of the CCD imaging device 37 is 4:3 and at a length of one side is 17 mm, for example. In this case, the distance E between the output screen 17a and the front end of the lens 33 and the distance F between the rear end of the lens 33 and the imaging surface 37a of the CCD imaging device 37 satisfy the relationship F=E/2. Although the depth of focus of the lens of the imaging device is of a small value, the lens 33 and the imaging device 37, both fixed to the rotatable flange 47, are rotated as one body. Hence, the optical axis does not move and the out-of-focus state hardly occurs.

A detailed description will be given of the relationships between the anamorphic lens 33 and the imaging device 37 of the camera 31.

Figure 6:
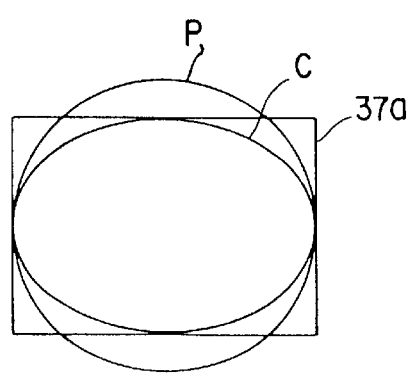
FIG. 6 is a schematic illustration showing the relationships between the image-receiving surface of the imaging device shown in FIG. 4 and an output image formed on the output surface of the X-ray image intensifier and transmitted through the anamorphic lens.

Referring to FIG. 6, an optical image P output from the output screen 17a of the X-ray image intensifier 13 is condensed in the vertical direction by the cylindrical lens 33c of the anamorphic lens 33, and is projected on the horizontally-elongated rectangular surface 37a of the solid-state imaging device 37 as an elliptical optical image C.

The anamorphic lens 33 shown in FIG. 1 is made up of a cylindrical lens systems 33c including one or more lenses, and a single-focus lens system 33d. As shown in FIG. 7, the substantially circular output image P of the X-ray image intensifier 13 is condensed in the direction Q corresponding to the shorter sides of the imaging surface of the imaging device 37 so that the substantially circular output image P can be inscribed in the outer periphery of the rectangular imaging surface 37a of the imaging device 37.

Figure 8:
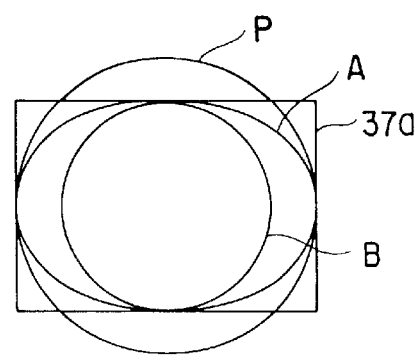
FIG. 8 is a schematic illustration showing the relationships between the light-receiving surface of the imaging device of the imaging device shown in FIG. 4 and the aberration of the output image formed on the output surface of the X-ray image intensifier and transmitted through the anamorphic lens.

A description will now be given with reference to FIG. 8 as to how the adverse effects of the aberration of the cylindrical lens system can be suppressed by condensing a circular image in the vertical direction and projecting it on the rectangular imaging surface of the CCD element.

The aberration of the cylindrical lens system is marked in the direction in which the magnification of an image is varied, and is not so in its perpendicular direction. As shown in FIG. 8, there are two methods in which a circular image is converted into an elliptical image by the anamorphic lens incorporating a cylindrical lens system, and in which the resultant image is formed on the imaging surface of the solid-state imaging device.

One of the two methods is to first form a circular image B on the imaging surface 37a without using the cylindrical lens system in such a manner that the circular image is in contact with the upper and lower sides of the imaging surface 37a. Then, this circular image B is elongated in the horizontal direction by using the cylindrical lens system, thereby forming an elliptical image A. The other method is to condense a circular image P in the vertical direction by using the cylindrical lens system in such a manner that the condensed image is in contact with the right and left sides of the imaging surface 37a. The latter method is used in the embodiment of the present invention.

With the anamorphic lens incorporating a cylindrical lens system, it is possible to perform either of these methods. The former method is disadvantageous in that aberration is caused in the horizontal direction in which an image is elongated, resulting in a degradation of the horizontal resolution. On the other hand, the latter method is disadvantageous in that aberration is caused in the vertical direction.

In general, the television system of an X-ray imaging apparatus is an NTSC system, and the number of scanning lines is 525 according to the specifications.

Of these 525 lines, the number of scanning lines that appear on the effective area of the screen is 485 or so. In the effective imaging area of the solid-state imaging device, therefore, 485 pixels are arranged in a vertical direction. In the case of a 400,000-pixel CCD solid-state imaging device, the use of which is very common in an X-ray imaging apparatus, the number of pixels arranged in the horizontal direction of the effective imaging area of the imaging device is 768, and all these pixels in the horizontal direction are used in the center of the effective imaging area. Since the resolution of the solid-state imaging device camera is determined by this number of pixels, the vertical resolution is inferior to the horizontal resolution. This holds true of the PAL television system and the SECAM television system as well. The resolutions of the solid-state imaging device camera of the NTSC system will be considered by way of example. In the case where an output image of the X-ray image intensifier is 15 mm, the horizontal resolution of the output screen is 51.2 lines/mm (768 lines÷15 mm), while the vertical resolution of the output screen is 32.3 lines/mm (485 lines÷15 mm). That is, the vertical resolution is lower than the horizontal resolution in 40%. This means that even if the vertical resolution of an image projected on the imaging surface of the CCD solid-state imaging device is lower than the horizontal resolution of the same image in 40% or so, such a resolution inferiority is considered allowable in practice.

As described above, the direction in which the resolution is lowered as a result of the aberration should be controlled to be the vertical direction of the solid-state imaging device. By this control, the degradation of the vertical-direction resolution arising from the vertical-direction aberration of the cylindrical lens becomes allowable, as long as that degradation is less than 40% of the degradation of the horizontal-direction resolution. This means that the aberration of the cylindrical lens system of the present invention is negligible in practice. Since a number of lenses need not be added for the correction of the adverse effects of the aberration, the anamorphic lens system can be made of a single cylindrical lens.

The aberration the anamorphic lens has on a projected image is attributed to the single-focus lens system as well, and the aberration of the single-focus lens occurs equally in all directions. Although the aberration of the single-focus lens system should be small, a single-focus lens system having a small aberration can be easily designed by employing a number of spherical lenses. It should be noted that a single-focus lens system made up of spherical lenses is comparatively low in price.

In order to permit the circular output image P of the X-ray image intensifier 13 to be focused on the rectangular imaging surface of the CCD imaging device as an elliptical image C, the elliptical image C has to be controlled in such a manner that the longer-axis direction thereof coincides accurately with the horizontal direction of the imaging surface 37a, i.e., the direction of the longer sides thereof.

FIGS. 9 and 10 show a structure for making fine adjustment of the shape of the elliptical image C. Referring to the Figures, a lens assembly 61 incorporating an anamorphic lens 33 is fixed to the camera 31 by means of a fixing member 62. The lens assembly 61 can be tilted at an arbitrary angle with reference to the fixing member 62, and can be made immovable by means of a fixing screw 63. The fixing member 62 is coupled to the rotatable flange 47 by threadably inserting its screw portion 62 which is a standardized screw called a "C-mount" into the corresponding female screw portion.

To set the lens assembly 61 in the camera 32, the fixing member 62 is attached to the lens assembly 61 beforehand, and the fixing member 62 is threadably inserted into the corresponding female screw portion of the rotatable flange 47. At the time, the angle of the anamorphic lens 33 is indefinite with reference to the solid-state imaging device 37. Then, the entire X-ray imaging apparatus 1 is operated, and the lens assembly 61 is rotated while simultaneously looking at the image on the television monitor, until the image on the television monitor becomes circular. After making fine adjustment, the lens assembly 63 is fixed at the position that enables a completely circular image to be accurately displayed, by fastening the fixing screw 63.

Let us assume that the aspect ratio of the imaging surface 37a is 3:4. In this case, the longer axis (horizontal axis) of an elliptical optical image is 4/3 times longer than the shorter axis (vertical axis) of the elliptical optical image, and this image is projected in such a manner as to be in contact with the upper, lower, right and left sides of the imaging surface 37a. The video signals corresponding to the elliptically distorted image produced by the camera is condensed only in the horizontal direction by the image processing apparatus 39, and is displayed on the CRT television monitor as a circular image similar to the output optical image of the X-ray image intensifier.

A CRT television monitor 21 having a deflection size of 1:1 may be employed. In this case, video signals are supplied thereto without passing through the image processing apparatus 39, so as to form a circular image on the monitor 21. The circular image is formed merely by reducing the amplitude of the horizontal deflection of the CRT television monitor.

In the foregoing embodiment, the entire anamorphic lens assembly is rotatable with reference to the fixing member with which to fix the lens assembly to the camera. This, however, in no way restricts the present invention. For example, one or some lenses having an optical power acting in the same direction may be selected from the anamorphic lens system and designed to be rotatable.

Needless to say, the connection between the lens assembly and the camera is not limited to the threadable insertion. As described above, the whole of the lens assembly or part of the lens system can be rotated in an arbitrary direction, with the anamorphic lens system fixed to the camera. With this structure, the two perpendicular directions between which the power of a lens differs can be made to correspond accurately to the horizontal and vertical directions of the solid-state imaging device, respectively. Therefore, when the solid-state imaging device camera and the lens are assembled in the apparatus, it is not necessary to employ a specially-designed fitting mechanism. Where the fitting mechanism is, for example, a threadable insertion type, the manufacturing cost is low. When the camera of the solid-state imaging device is assembled, the lens fitting mechanism need not be worked with particularly high precision, and the camera can be easily manufactured, accordingly. In addition, the anamorphic lens system and the solid-state imaging device camera can be assembled by utilization of a C-mount, which is a standardized screw system widely employed in an ordinary lens or camera. Since the C-mount can be used incorporated in an inexpensive general-purpose solid-state imaging device camera, an X-ray imaging apparatus obtained thereby is comparatively low in price.

In the embodiment described above, the cylindrical lens 33 of the anamorphic lens 33 is made of a single cylindrical lens, but may be made of a number of cylindrical lenses. In addition, the cylindrical lens 33c and the single-focus lens system 33d may be housed in different casings though they may be arranged in the same housing in the above embodiment. The use of the cylindrical lens in the anamorphic lens 33 is advantageous in that the resultant anamorphic optical system is smaller in size and lower in price than an anamorphic lens system employing an expensive prism lens.

Figure 11:
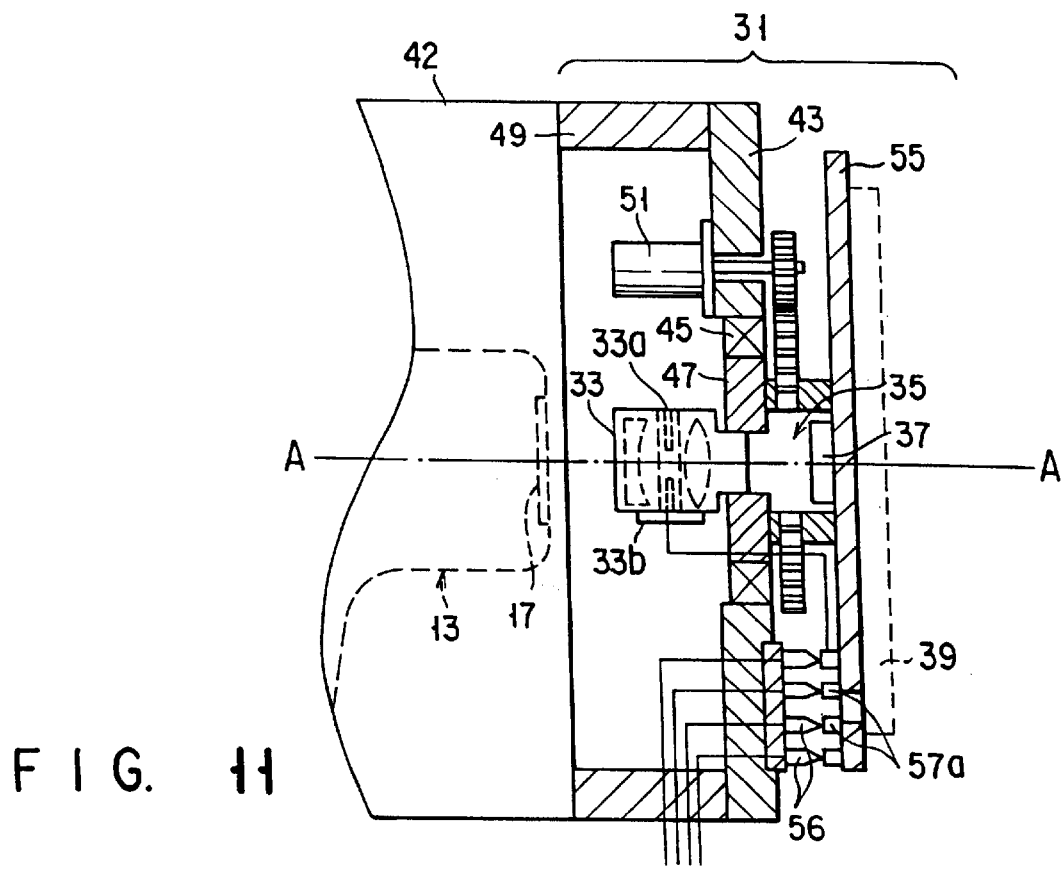
FIG. 11 is a schematic sectional view of an imaging device according to an embodiment different from that shown in FIG. 1.

FIG. 11 is a schematic illustration showing another embodiment of the camera depicted in FIG. 4. In FIG. 11, the same reference numerals or symbols as in FIG. 4 are used to denote the corresponding or similar structural elements, and a detailed description of them will be omitted herein. In the camera 31 shown in FIG. 11, a CCD imaging device 37, a circuit section 39 and slip rings 57a are provided on the same board 55.

This structure permits the camera to be short in the axial direction, so that an X-ray imaging apparatus provided can be made compact in size.

Figure 12:
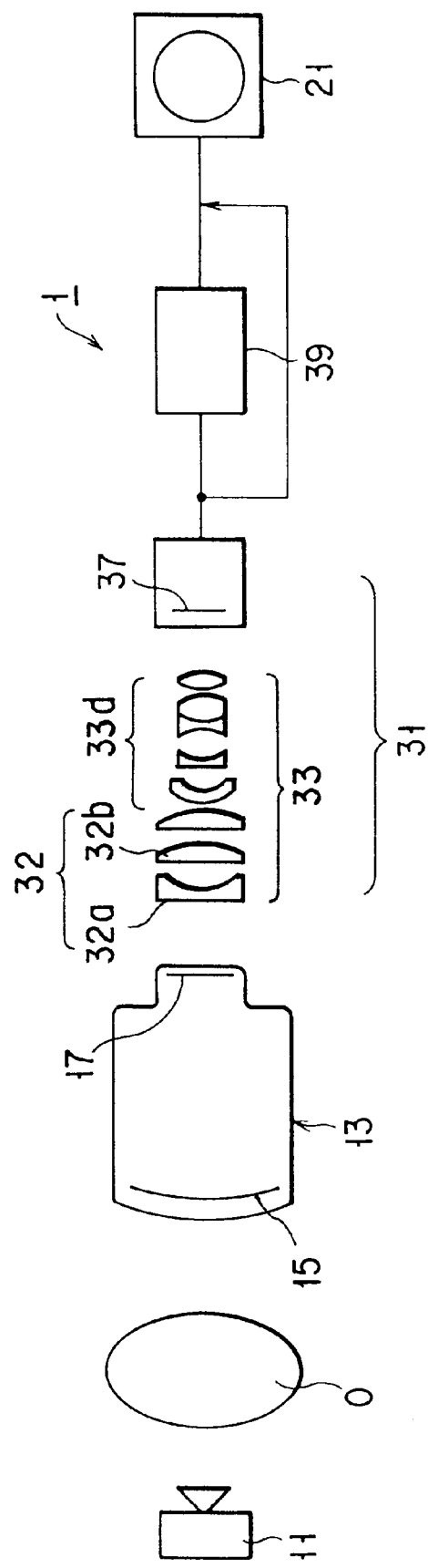
FIG. 12 is a schematic illustration of an X-ray imaging apparatus which is according to another embodiment of the present invention and which captures an output image on the output surface of the X-ray image intensifier.
Figure 13:
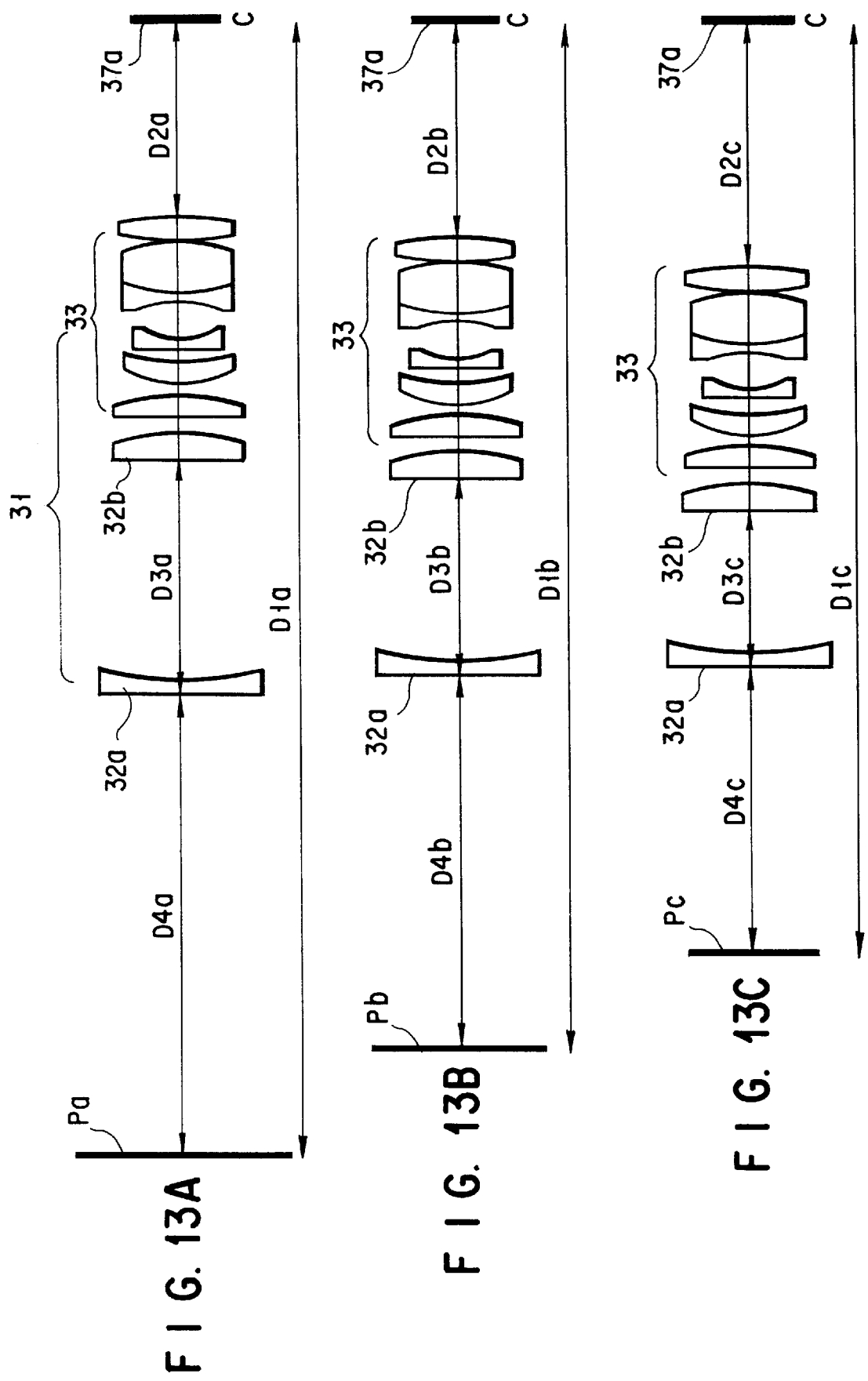
FIGS. 13A, 13B and 13C are schematic illustrations each showing how the lenses incorporated in the camera of the X-ray imaging apparatus shown in FIG. 12 are adjusted in position.
Figure 14:
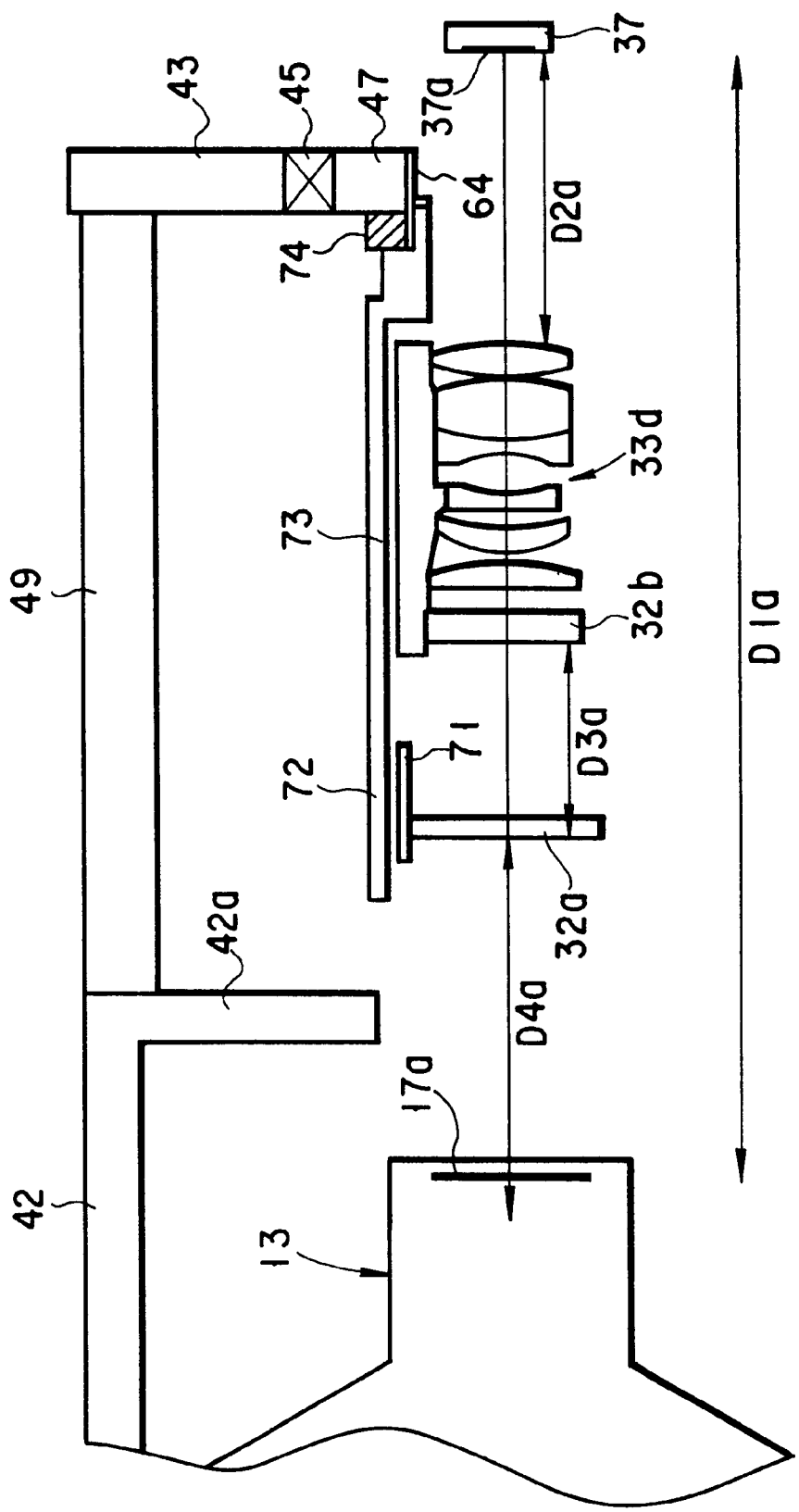
FIG. 14 shows how the X-ray image intensifier and the camera are assembled.

The embodiment shown in FIGS. 12–14 is directed to an X-ray imaging apparatus wherein a single camera 31 can be combined with a number of types of X-ray image intensifiers having output fluorescent screens of different diameters, and wherein a similar or substantially similar image can be projected on the CCD imaging device.

There are a variety of types of X-ray image intensifiers used in general, and the circular output optical images produced by them have diameters of 15 mm, 20 mm, 25 mm, 30 mm, etc. In addition, the solid-state imaging devices (e.g., CCD imaging devices) have imaging surfaces of many different sizes, such as ⅔-inch, ½-inch, ⅓-inch format sizes.

Therefore, a large number of anamorphic optical system apparatuses have to be prepared, depending upon combinations between X-ray image intensifiers and solid-state imaging devices. In order to vary the reduction rate of the anamorphic optical system of the foregoing embodiment, one of the three lens systems has to be replaced with another. Since recently-provided systems are designed to be compact in size and free of maintenance by integrally incorporating an optical device, a solid-state imaging device and related signal processing circuit elements in the same housing as the X-ray image intensifier, it is not desirable to prepare a large number of devices and use them in combination.

This embodiment is intended to solve this problem and the object thereof is to provide an X-ray imaging apparatus capable of changing the image magnification by use of an anamorphic optical system of a specific lens structure. To achieve this object, the anamorphic optical system of the X-ray imaging apparatus is made up of a single-focus lens system having a number of lenses, and a cylindrical lens system having two or more lenses. One or more of the lenses of the cylindrical lens system are moved in the optical axis direction to an arbitrary or predetermined position with reference to the other lenses.

In the embodiment, the anamorphic lens 33 includes a cylindrical lens system 32 made up of two cylindrical lenses 32a and 32b that are arranged on the side of the X-ray image intensifier. The anamorphic lens 33 also comprises a single-focus lens system 33d made up of a number of spherical lenses that are arranged on the side of the solid-state imaging device. Of the two cylindrical lenses, that cylindrical lens 32a which is located closer to the X-ray image intensifier is movable in the optical axis direction with reference to the other.

In the anamorphic lens 33, the lens activity of the cylindrical lens system 32 can be controlled independently of that of the single-focus lens system 33d by moving one of the lenses of the cylindrical lens system 32 independently of the other. Therefore, the lens activity acting only in the direction in which the cylindrical lens system and the single-focus lens system have a lens activity can be changed, and the focusing position can be controlled to coincide with the position where an image is focused only by the lens activity of the single-focus lens system.

FIGS. 13 show how the lenses, output images Pa, Pb and Pc of the X-ray image intensifier 13, the position of the imaging surface 37a of the solid-state imaging device 37, and the diameters of images are related to one another when the anamorphic lens 33 mentioned above is employed. FIG. 13A shows the case where the output optical image Pa of the X-ray image intensifier 13 is 25 mm in diameter, FIG. 13B shows the case where the output optical image Pb is 20 mm in diameter, and FIG. 13C shows the case where the output optical image Pc is 15 mm. The imaging surfaces 37a of the solid-state imaging devices of these cases have the same size.

In the above cases, the distances between the output optical image of the X-ray image intensifier and the imaging surface of the solid-state imaging device are denoted by D1a, D1b and D1c, the distances between the imaging surface of the solid-state imaging device and the lens 33 are denoted by D2a, D2b and D2c, the distances between the two cylindrical lenses 32a and 32b are denoted by D3a, D3b and D3c, and the distances between the X-ray image intensifier and the cylindrical lens 32a arranged close thereto are denoted by D4a, D4b and D4c. The distances are variable. It should be noted, however, that the positional relationships and distances between the cylindrical lens 32b arranged closer to the solid-state imaging device and the single-focus lens system 33 are fixed.

An elliptical image C having the same size as the imaging surface 37a of the solid-state imaging device can be formed by varying the distances.

In other words, even in the cases where the output optical images P of the X-ray image intensifiers are 25 mm, 20 mm and 15 mm in diameter, an elliptical image C of the same size is formed on the imaging surface 18a of the solid-state imaging device.

In these cases, the distances indicated in FIGS. 13 are as follows:

D1a>D1b>D1c,

D2a<D2b<D2c,

D3a>D3b>D3c, and

D4a>D4b>D4c.

FIG. 14 shows how the X-ray image intensifier, the anamorphic lens and the solid-state imaging device are combined together, and illustrates a specific mechanism that employs these structural elements to change the distances. Referring to this Figure, the cylindrical lens 32a located closer to the X-ray image intensifier is supported by a support member 71, in such a manner as to be movable along a casing 72 in the optical axis direction. By this movement, the distance D3 between the cylindrical lenses 32a and 32b can be adjusted. In the Figure, illustration of a structure for enabling the movement is omitted.

The cylindrical lens 32b located closer to the solid-state imaging device and the lenses of the single-focus lens system 33d are supported by another support member 73, and these lenses are movable as one body along the casing 72 in the optical axis direction.

The casing 72 of the anamorphic lens 33 is provided with a male screw at a position where it is connected to the rotatable flange. The rotatable flange 47 is provided with a female screw at the corresponding position. The casing 72 and the rotatable flange 47 are connected together by the screws.

The distance D2 between the imaging surface of the solid-state imaging device and the anamorphic lens 33 is coarsely determined by interposing a ring-like spacer 74 between the casing 72 and the rotatable flange 47. A fine adjustment of the distance D2 can be made by moving the support member 73 inside the casing. The distance between the output fluorescent screen 17a of the X-ray image intensifier and the imaging surface 37a of the solid-state imaging device 37 can be adjusted by properly determining the length of the support poles 49, which are provided between the bottom plate 42a and the camera flange 43 to connect them to each other.

If the diameters of the output images of the X-ray image intensifier of the X-ray imaging apparatus are several in number, or if the sizes of the imaging surfaces of the solid-state imaging devices are several in number, then the positions to which the cylindrical lens is moved and fixed can be limited to be several in number. This simplifies the adjustment required.

As described above, in the anamorphic lens 33, one of the lenses of the cylindrical lens system is movable with reference to the other in the optical axis direction. Since different magnifications are attained by that movement, elliptical images of the same size can be formed on the imaging surface of the slid-state imaging device. In this manner, a structure made up of a single optical lens and an imaging device can be used to cope with output images of various diameters formed by the X-ray image amplifying tube.

The above description was given referring to the case where the imaging surfaces of the solid-state imaging devices had the same size. Even the case where the imaging surfaces of the solid-state imaging surfaces have different sizes can be coped with by changing the distance between the lens system and the position of an image in the manner described above.

As described above, this embodiment is applicable to an X-ray image intensifier that employs a single optical system and outputs images of different diameters, or to solid-state imaging devices having imaging surfaces of different sizes. Since, therefore, a large number of anamorphic optical systems having different powers are not needed, it is possible to realize an X-ray imaging apparatus that is low in price as a whole.

In recent years, a CCD sensor having a substantially square imaging surface is developed. In the case of this type of CCD sensor, it is not necessary to employ an anamorphic lens.

As described above, an X-ray imaging apparatus comprises a camera wherein a lens, an imaging device, a circuit for driving the imaging device, and a board having a circuit used for processing video signals that are produced from the imaging device are integrally rotatable as one body. Even when an X-ray image intensifier and an X-ray generator are revolved around an object, an output image formed on the output surface can be displayed as an upright image, if required. In addition, with the structure described above, it is possible to provide an X-ray imaging apparatus which enables the X-ray image intensifier, the lens and the imaging device to align with one another, with no significant error, which prevents a defocused state, and which can be manufactured at low cost.

What is claimed is:

1. An X-ray imaging apparatus comprising: an X-ray image intensifier for converting an X-ray image into a completely-round output visible-light image; an optical lens assembly for focusing the output visible-light image on a predetermined position; a solid-state imaging device arranged at the predetermined position where the output visible-light image is focused by the optical lens assembly; a signal processing circuit board for driving the solid-state imaging device and processing output image signals produced therefrom; a support frame, mechanically fixed to the X-ray image intensifier, for mechanically supporting the optical lens assembly, the solid-state imaging device and the signal processing device circuit board; and a revolving means for revolving the solid-state imaging device relative to the X-ray image intensifier such that an optical center axis coincides with a center of revolution of the solid-state imaging device, said signal processing circuit board being arranged such that the optical center axis extends therethrough, and said solid-state imaging device being fixed to the signal processing circuit board and having a rectangular image-receiving surface, said optical lens assembly being mounted on the signal processing circuit board, such that the optical lens assembly and the signal processing circuit board constitute one mechanical body, said optical lens assembly being provided in one of a state wherein said optical lens assembly is directly mounted on the signal processing circuit board and a state wherein another member is interposed between said optical lens assembly and the signal processing circuit board, said support frame holding a rotating motor fixed thereto, and said motor rotating the solid-state imaging device, the signal processing circuit board and the optical lens assembly as one body with relative to the support frame, a plurality of slip rings being arranged close to the solid-state imaging device in a concentric manner and being rotatable together with the solid-state imaging device, and electric power and output image signals being supplied to the solid-state imaging device and the signal processing circuit board by way of the slip rings.

2. The X-ray apparatus according to claim 1, wherein said slip rings are concentrically fixed to one of the signal processing circuit board and a flat plate provided independently of the signal processing circuit board and arranged perpendicular to the optical center axis.

3. The X-ray imaging apparatus according to claim 1, wherein said optical lens assembly includes an anamorphic lens system incorporating a cylindrical lens, said anamorphic lens system forming an elliptical image by enlarging or reducing the output visible-light image of the X-ray image intensifier in one direction, and projects the elliptical image on the rectangular image-receiving surface of the solid-state imaging device such that longer-axis directions of the elliptical image and the image-receiving surface coincide with each other.

4. The X-ray imaging apparatus according to claim 3, wherein said optical lens assembly includes a fine adjustment mechanism for making fine adjustment of an angular position to which the solid-state imaging device is revolved around the optical center axis and for positioning the solid-state imaging device at the angular position.

5. The X-ray imaging apparatus according to claim 1, wherein said optical lens assembly is arranged in a space inside the support frame, and said motor is arranged in a space surrounding the optical lens assembly.

6. The X-ray imaging apparatus according to claim 1, wherein said optical lens assembly includes an electrically-driven diaphragm, said diaphragm being driven by a driving signal supplied by way of the slip rings.

7. The X-ray imaging apparatus according to claim 3, wherein said optical lens assembly includes a single-focus lens system made up of a plurality of lenses, and a cylindrical lens system made up of two or more lenses, at least one of the lenses of the cylindrical lens system being movable in an optical-axis direction to an arbitrary or predetermined position with reference to other lenses.

8. The X-ray imaging apparatus according to any one of claims 3, 4 and 7, wherein said cylindrical lens form an image whose size is reduced in a vertical direction of the solid-state imaging device.

* * * * *